United States Patent
Mammone et al.

[11] Patent Number: 6,038,528
[45] Date of Patent: *Mar. 14, 2000

[54] ROBUST SPEECH PROCESSING WITH AFFINE TRANSFORM REPLICATED DATA

[75] Inventors: Richard Mammone, Bridgewater; Xiaoyu Zhang, Piscataway, both of N.J.

[73] Assignee: T-Netix, Inc., Englewood, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/682,448

[22] Filed: Jul. 17, 1996

[51] Int. Cl.$^7$ .................................................. G10L 5/06
[52] U.S. Cl. ........................... 704/203; 704/245; 704/250
[58] Field of Search ..................... 704/243, 246, 704/219, 200, 236, 250, 203, 204, 245

[56] References Cited

U.S. PATENT DOCUMENTS

| | | |
|---|---|---|
| 4,956,865 | 9/1990 | Lennig et al. ........................... 704/241 |
| 5,230,036 | 7/1993 | Akamine et al. ....................... 704/200 |
| 5,271,088 | 12/1993 | Bahler .................................... 704/200 |
| 5,323,486 | 6/1994 | Taniguchi et al. ..................... 704/222 |
| 5,390,278 | 2/1995 | Gupta et al. ............................ 704/243 |
| 5,414,755 | 5/1995 | Bahler et al. ............................ 379/67 |
| 5,522,012 | 5/1996 | Mammone et al. . |
| 5,583,963 | 12/1996 | Lozach ................................... 704/219 |
| 5,646,961 | 7/1997 | Shoham et al. ..................... 704/227 X |
| 5,839,103 | 11/1998 | Mammone et al. .................... 704/232 |
| 5,864,806 | 1/1999 | Mokbel et al. ......................... 704/234 |
| 5,924,065 | 7/1999 | Eberman et al. ....................... 704/231 |

OTHER PUBLICATIONS

Delphin–Poulat et al., "Frame–Synchronous Stochastic Matching Based on the Kullback–Leibler Information," Proceedings of the 1998 IEEE International Conference on Acoustics, Speech and Signal Processing, vol. 1, pps. 89–92, May 1998.

A*—Admissible Heuristics for Rapid Lexical Access; 1991 IEEE Proceedings of the Int'l Conference on Acoustics, Speech and Signal Processing; pp. 689–692, Jul. 1991.

Harper Collins Dictionary of Mathematics (definition of affine transform), p. 9, Dec. 1991.

Zhang and Mammone, "Channel and Noise Normalization Using Affine Transformed Cepstrum," ICSLP 96. Proceedings., Fourth International Conference on Spoken Language, 1996, vol. 4, pp. 1993 to 1996, Oct. 1996.

A. Nadas et al. "Adaptive Labeling: Normalization of Speech by Adaptive Transformations Based on Vector Quantization" ICASSP Conf. 1988, pp. 521–524.

L. Newneyer et al. "Probalistic Optimum Filtering For Robust Speech Recognition", ICASSP Conf. 1994, pp. 417–420.

H. Gish et al. "Robust Mapping of Noise Speech Parameters For HMM Word Spotting", ICASSP Conf. pp. 109–112.

F. Liu et al. "Efficient Joint Compensation of Speech For The Effects of Additive Noise and Linear Filtering", ICASSP Conf. 1992 pp. 257–260.

M.G. Mazin et al. Signal Bias Removal For Robust Telephone Based Speech Recognition In Adverse Environments, ICASSP Conf. 1994, pp. 445–448.

*Primary Examiner*—David R. Hudspeth
*Assistant Examiner*—Martin Lerner
*Attorney, Agent, or Firm*—Dorsey & Whitney LLP

[57] ABSTRACT

The present invention relates to a robust speech processing method and system which models channel and noise variations with affine transforms to reduce mismatched conditions between training and testing. The affine transform relating the training vectors $C_k$ with the vectors for testing condition $c_{k'}$ is represented by the form:

$$c'_k{}^T = Ac_k{}^T + b$$

for k=1 to N in which A is a matrix of predicator coefficients representing noise distortions and vector b represents channel distortions. Alternatively, an affine invariant cepstrum is generated during testing and training for modeling speech to account for noise and channel effects. From the improved speech processing, improved speaker recognition with channel and noise variations is obtained.

7 Claims, 15 Drawing Sheets

| INDEX | AFFINE PARAMETERS | ENVIRONMENT (ENV) | CLASSIFIER |
|---|---|---|---|
| 1 | $A_1$ $b_1$ | $ENV_1$ | CLASSIFIER 1 |
| 2 | $A_2$ $b_2$ | $ENV_2$ | CLASSIFIER 2 |
| ⋮ | ⋮ | ⋮ | ⋮ |
| N | $A_N$ $b_N$ | $ENV_N$ | CLASSIFIER N |

*Fig. 4B*

ROBUST SPEECH PROCESSING WITH AFFINE TRANSFORM REPLICATED DATA

BACKGROUND OF THE INVENTION

1. Field of the Invention

The present invention relates to a method for robust speech processing through modeling channel and noise variations with affine transforms.

2. Description of the Related Art

Conventional speaker and speech recognition systems enable a computer to successfully perform voice verification or speech recognition. An identified speaker pattern can be used in a speaker verification system in order to verify a speaker's claimed identity from an utterance. It is known that conventional telephone switching systems often route calls between the same starting and ending locations on different channels. In addition, different telephony systems such as electret handset telephones, cellular telephones and speaker telephones operate over different channels and have varying noise conditions. A spectrum of speech determined from the different channels can have a different shape due to the effects of the channel or noise. Recognition of speakers or speech on different channels under varying noise conditions is therefore difficult because of the variances in the spectrum of speech due to non-speech spectral components.

Speech has conventionally been modeled in a manner that mimics the human vocal tract. Linear predictive coding (LPC) has been used for describing short segments of speech using parameters which can be transformed into a spectrum of positions (frequencies) and shapes (bandwidths) of peaks in the spectral envelope of the speech segments. LPC cepstral coefficients represent the inverse z transform of the logarithm of the LPC spectrum of a signal. Cepstrum coefficients can be derived from the frequency spectrum or from linear predictor (LP) coefficients. Cepstrum coefficients can be used as dominant features for speaker recognition.

One conventional attempt for modeling noise and environmental changes uses an adaptive transformation for normalization of speech, see Naidas et al., *Adaptive Labeling Normalization Of Speech By Adaptive Transformation Based on Vector Quantization*, IEEE, 1988. A transformation due to the changes in the talker is represented as $A_t^{(1)}$. A transformation defined by environmental changes and noise is represented by $A_t^{(2)}$ and a nonadaptive signal processing transform is represented by $A_t^{(3)}$. The unadapted signal available to the recognizer is represented by $$X(t) = A_t^{(3)} A_t^{(2)} A_t^{(1)} X_0(t).$$

The normalization transformation is perturbed by moving the transformation in the direction to reduce error.

Another conventional attempt models variations in channel and noise conditions by transformation of the cepstrum coefficients. The transformation in the cepstrum domain of a speech vector has been defined as $c'(n) = ac(n) + b$ wherein "a" represents rescaling of cepstrum vectors and "b" is a correction for noise. Conventional methods determine the "best" transform parameters by either mapping the test data to the training model or the training model to the test data. After mapping is performed, a metric is used to measure the distance between the transformed and target cepstrum coefficients. The drawback of the above described mapping scheme is that uncertainty can be introduced into the distance measure since the method assumes that every model is available as a potential match for a test object and thus the method matches test data even if the imposter's model is far away from the target. It is desirable to provide a method for robustly processing speech to minimize channel and noise variations.

SUMMARY OF THE INVENTION

Briefly described, the present invention relates to processing speech using affine transform parameters to correct for deviations of the speech signal due to channel and noise during training and testing. Preferably, the processed speech can be used in a speaker verification system for verifying the identity of a speaker. The robust method can be used to recognize a speaker regardless of the type of phone used to place the call and environment the call is placed from. For example, the method can account for a speaker using a cellular phone used in a traveling car or a cellular phone in a large crowd of people.

It has been found that linear predictive coefficients are affinely transformed when the speech is contaminated by environmental perturbations, thereby resulting in affine transforms of the cepstral coefficients. The transformations are dependent on spectral properties of the speech signal. It has also been found that a degraded spectrally similar set of cepstral vectors undergo the same transformation. In the method of the present invention, the affine transform speech is represented by:

$$c' = Ac + b,$$

wherein c' is a cepstrum of degraded speech, c is the cepstrum of original speech, A is a matrix representing the effects of noise and b is a vector representing the channel variations. Preferably, the channel and noise variations are modeled as mean values of "A" and "b" and the variations are modeled about the mean values as random variations about the mean value.

In one embodiment, affine transform parameters are determined from clean speech and development speech samples. For example, development speech can be speech samples having the same content recorded by the same speaker in different telephony environments. Development speech can also include speech having the same content recorded by different speakers in different telephony environments. The affine transform parameters are determined from a cepstrum of the clean speech and cepstrum of the development speech. The affine transform parameters are used to generate an extended data set of training speech samples. Thus, the training speech sample is extrapolated as though various telephony environments and noise conditions were used for training. A classifier performs either template matching or probabilistic likelihood computation on the features of the speech. Before the classifiers can be used for classification, the classifiers are trained so that mapping from the feature to the label of a particular class is established. In this embodiment, the classifiers are trained with the extended data set. Thereafter, the trained classifiers are used to classify features of the speech signal. A testing speech sample is classified with one of the trained classifiers to determine the similarities between the testing speech sample and speech stored during training for the speaker in order to provide for speaker verification.

In an alternate embodiment, affine transform parameters are determined from a cepstrum of clean speech and a cepstrum of training speech samples made by the speaker. The determined affine transform parameters are stored in a database in which the determined set of affine transform parameters are indexed to a particular noise and channel environment. Thereafter, a classifier is trained for each environment. The classifier is indexed in the database to the respective affine transform parameters. During testing, affine transform parameters are determined from a cepstrum of a testing speech sample and the cepstrum of the clean speech sample set up in advance. The database is searched for the closest match of the testing affine transform parameters with the stored affine transform parameters. The test speech is classified with the classifier corresponding to the matched affine transform parameters. With the affine transform, better performance of speech recognition, speaker verification and voice verification systems at low signal to noise ratio is achieved.

In an alternate embodiment, an affine invariant cepstrum is determined from the centroid and variance of the cepstral vectors of the speech samples. An affine invariant training cepstrum is determined from a training speech sample and is stored in a database. An affine invariant testing cepstrum is determined from a testing speech sample. The affine invariant testing cepstrum is compared to the stored affine invariant training cepstrum for determining the closest match, thereby identifying the speaker.

The invention will be more fully described with reference to the following drawings.

BRIEF DESCRIPTION OF THE DRAWINGS

FIG. 4B is a schematic diagram of the database shown in FIG. 4A.

DETAILED DESCRIPTION OF THE INVENTION

During the course of this description like numbers will be used to identify like elements according to the different figures which illustrate the invention.

Figure 1:
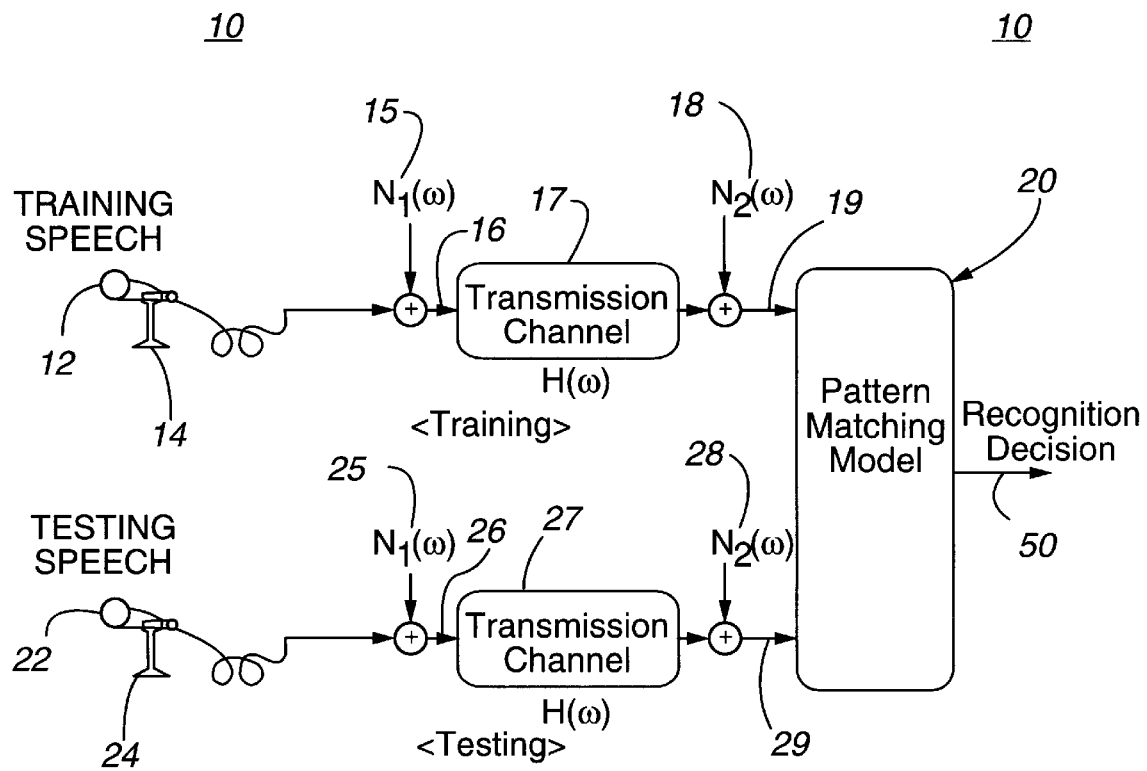
FIG. 1 is a schematic diagram of a speech acquisition and verification system in accordance with the present invention.

FIG. 1 illustrates a schematic diagram of a speech acquisition and verification system 10 in accordance with the teachings of the present invention. Training speech 12 is spoken into speech receiving device 14 for producing a training speech signal. Speech acquisition and verification system 10 can be used for voice verification, speech recognition, or speaker identification. Speech receiving device 14 can be any telephony device such as an electret handset, carbon button telephone, cellular telephone, speaker phone and the like.

Noise 15, $N_1(\omega)$, present in the environment of speech receiving device 14 modifies training speech signal 12 resulting in modified speech signal 16. Modified speech signal 16 is transmitted over transmission channel 17. Transmission channel 17 can include for example a PBX exchange, local telephone network, long distance telephone network, cellular telephone network and the like. Noise 18, $N_2(\omega)$, present in the channel environment modifies the transmitted speech signal of transmission channel 17 to form modified transmitted speech signal 19. Modified transmitted speech signal 19 is applied to pattern matching model 20, the details of which will be described more fully below. For example, pattern matching model 20 can be performed with software modules executed on a 100 MHZ Pentium personal computer.

Testing speech 22 is spoken into speech receiving device 24 for producing a testing speech signal. Preferably, testing speech 22 has the same content as training speech 12. Speech receiving device 24 can be the same or a different type of telephony device as speech receiving device 14. Noise 25, $N_1'(\omega)$, present in the environment of speech receiving device 24 modifies testing speech 22 resulting in modified speech signal 26. Modified speech signal 26 is transmitted over transmission channel 27. Transmission channel 27 can be the same or a different type of channel as transmission channel 17. Noise 28, $N_2'(\omega)$, present in the channel environment modifies the transmitted speech signal of transmission channel 27 to form modified transmitted speech signal 29. Pattern matching model 20 determines the correlation between modified transmitted speech signal 19 and modified transmitted speech signal 29 using affine transform parameters for providing a voice verification, speech recognition or speaker identification decision 50.

Figure 2A:
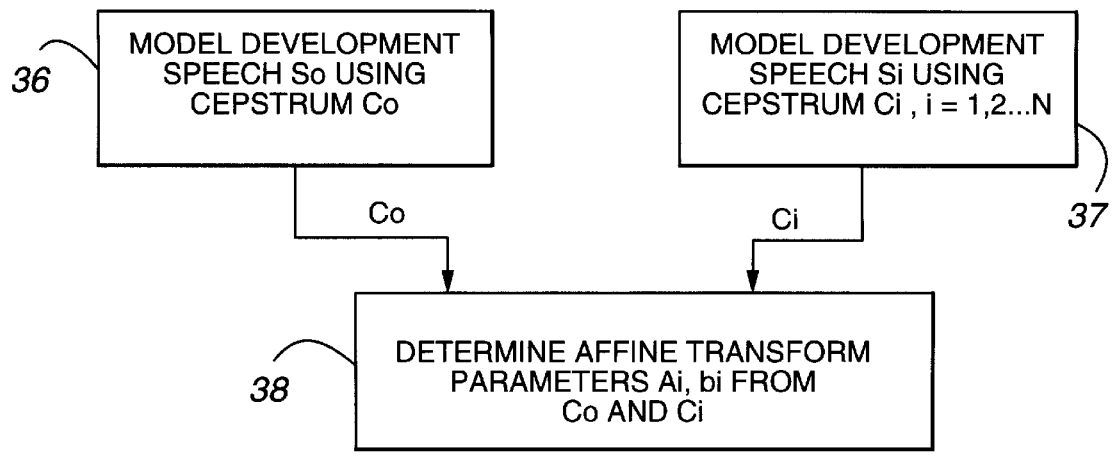
FIG. 2A is a flow diagram of preprocessing for an embodiment of the pattern matching model shown in FIG. 1.
Figure 2B:
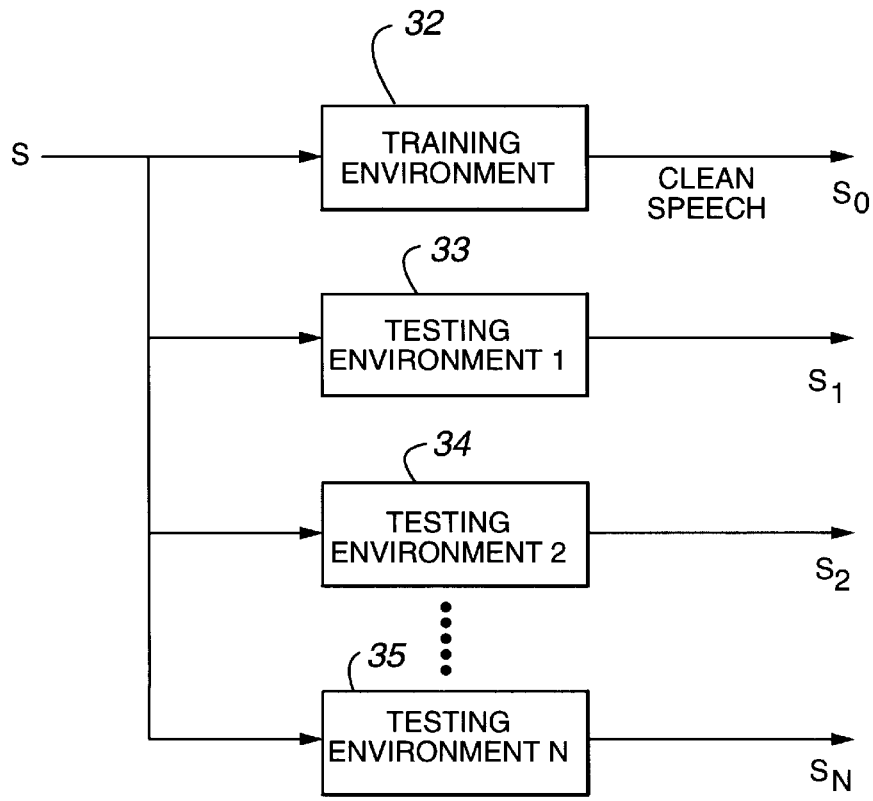
FIG. 2B is a flow diagram of speech data used in the embodiment of pattern matching model shown in FIG. 2A.

FIGS. 2A–2D illustrate one embodiment of pattern matching model 20. Preprocessing of development speech used for training pattern matching model 20 is illustrated in FIG. 2A. Development speech is speech having the same content obtained from the same speaker in different telephony environments. Development speech can also include speech having the same content obtained from different speakers in different telephony environments. Development speech can include clean speech including only noise in the training environment represented by $S_0$ in block 32. Speech in various testing environments, 1 to N is represented respectively by $S_i$, wherein i=1,2 . . . N in blocks 33, 34 and 35 in FIG. 2B. For example, speech, $S_1$ can represent speech in environment 1 which is a cellular environment and speech $S_2$ can represent speech in environment 2 which is a carbon button phone environment. In block 36, development clean speech $S_o$ is modeled using cepstrum coefficient $C_o$. The development speech in various testing environments $S_i$ is modeled in block 37 using cepstrum coefficients $C_i$ for i=1, 2 . . . N. Block 38 determines affine transform parameters $A_i$, $b_i$ from cepstrum coefficients $C_o$ and $C_i$, the details of which will be more fully described below.

Figure 2C:
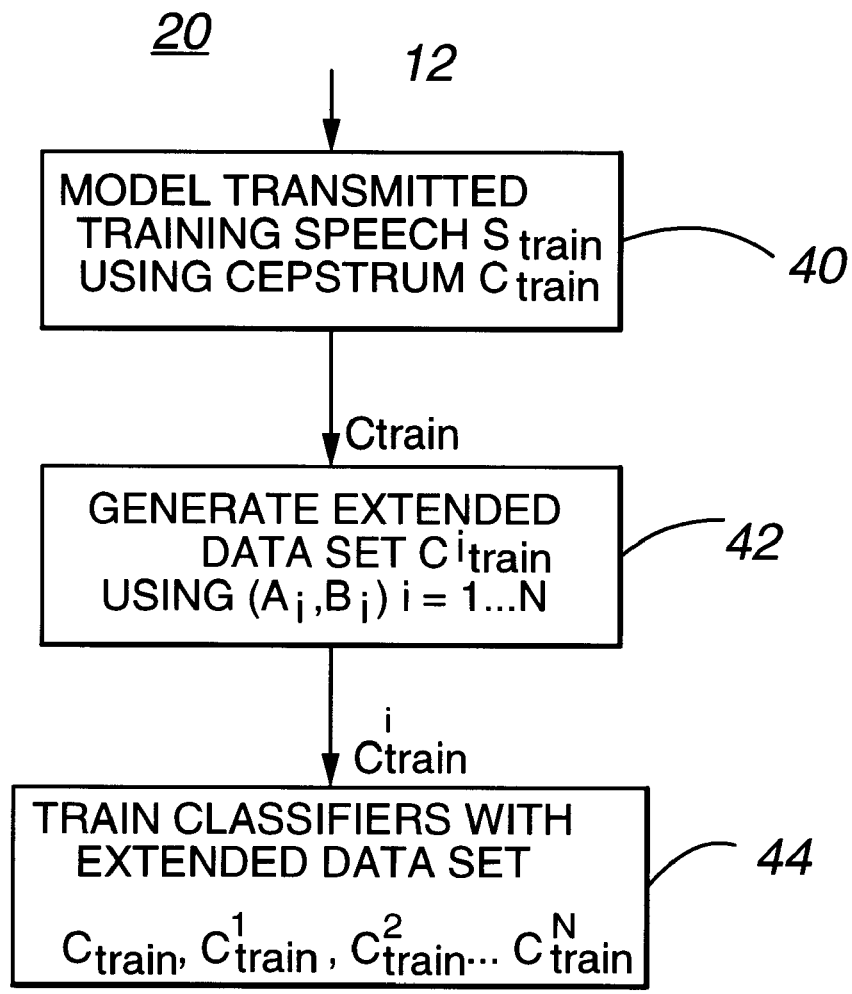
FIG. 2C is a flow diagram of the pattern matching model during training.

Training of pattern matching model 20 is shown in FIG. 2C. During enrollment of a speaker in speech acquisition and verification system 10, training speech 12, $S_{train}$, is uttered by the speaker. For example, training speech 12, $S_{train}$, can comprise four repetitions of a password. In block 40, training speech 12, $S_{train}$, is modeled with cepstrum coefficient $C_{train}$. An extended data set is generated for $C_{train}$ in block 42, which is represented by cepstrum coefficient $C^i_{train}$ using affine parameters $A_i$, $b_i$ for i=1,2, ... N which were determined in block 38. The extended data set can be represented by cepstrum coefficients $C_{train}, C^1_{train}, C^2_{train} \cdots C^N_{train}$. The extended data set of cepstrum coefficients $C^i_{train}$ in generated in block 42 is used to train classifiers in block 44.

Figure 2D:
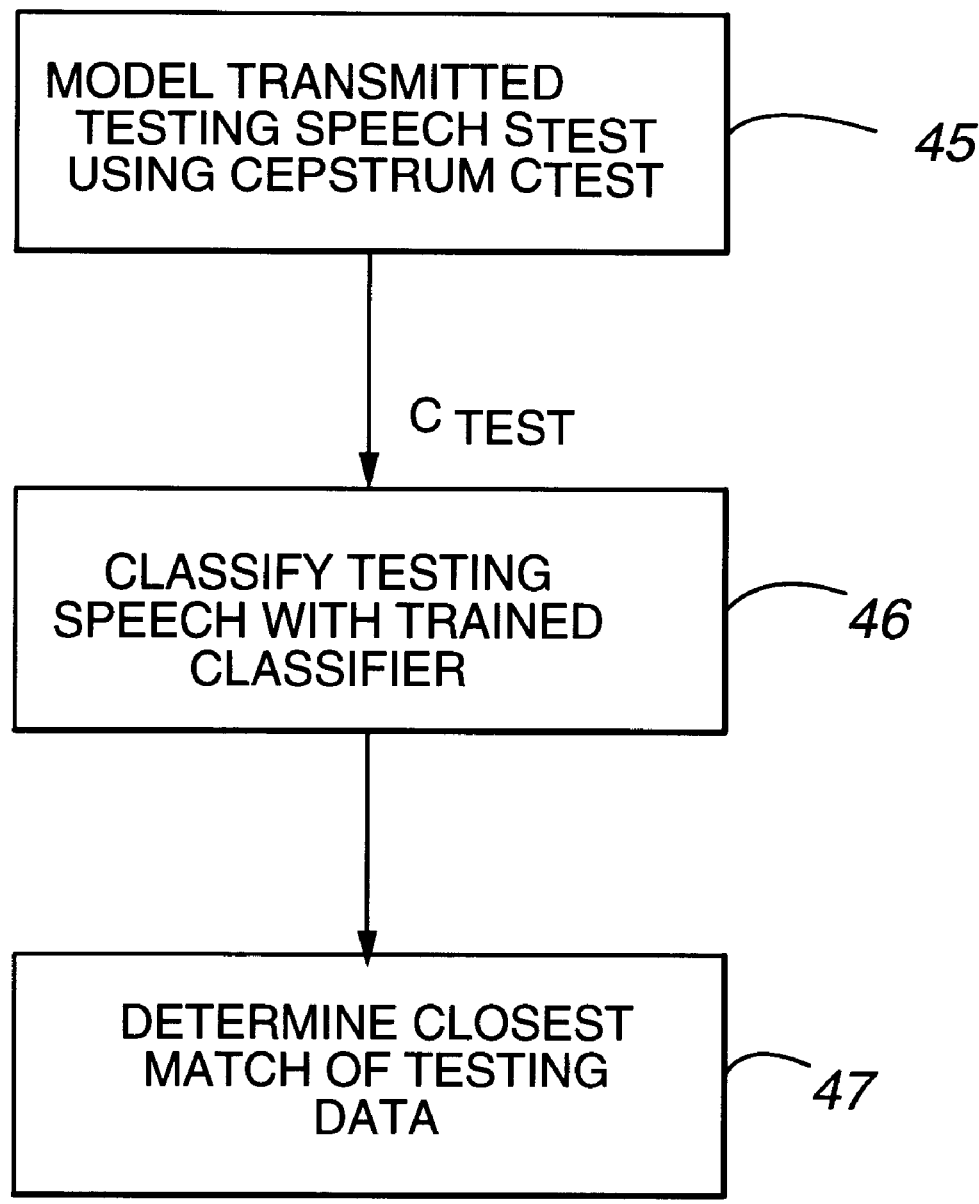
FIG. 2D is a flow diagram of the pattern matching model during testing.

Testing of pattern matching model 20 is shown in FIG. 2D. Testing speech 22, $S_{test}$, is uttered by the speaker. Preferably, in a speaker verification system, testing speech 22 $S_{test}$ is the same pattern as training speech, $S_{train}$. Testing speech 22, $S_{test}$, is modeled using cepstrum coefficient $C_{test}$ in block 45. Cepstrum coefficient $C_{test}$ is classified in block 46 with trained classifiers generated from block 44. In block 47, a determination of the closest match of testing speech 22, $S_{test}$, to one of the trained classifiers of block 44 is determined.

In a speech recognition system, training speech 12, $S_{train}$ represents a speech pattern. Testing speech 22, $S_{test}$ is the same speech pattern as training speech 12, $S_{train}$ and can be spoken by the same or different speakers.

An experiment was performed for speaker verification with 44 speakers in which 27 males and 17 were females. The speech was recorded over either a carbon-button phone or an electret user phone. Each speaker was asked to say the word "balance beam" for 6 to 8 times. The first 3 repetitions of the word were used to train the speaker's model and the remainder of the repetitions were used for verification. Every single repetition of a speaker was used to test against the models of all speakers enrolled in the database, meaning that speaker i's utterance of "balance beam" will be claimed to be speaker 1, speaker 2, etc. and an independent trial was set up for every claim of identity.

To expand the training data, the training data was expanded with affine transform parameters (A,b) as described above computed from data which was recorded on both electret and carbon-button phones. Baseline results indicate results without using affine transform parameters and replication results indicate the use of the affine transform parameters of the present invention.

The results are shown in the following table.

|  | Baseline | Replication |
| --- | --- | --- |
| False Accept (FA) | 7.05% | 5.43% |
| False Reject (FR) | 4.73% | 3.38% |
| Equal Error Rate (EER) | 3.51% | 2.35% |

Another experiment was performed on speech data collected over a cellular network for the above-described database. The level of channel variations in the cellular network is considerably larger than the typical landline network. The results are shown in the following table.

|  | Baseline | Replication |
| --- | --- | --- |
| False Accept (FA) | 0.94% | 0.85% |
| False Reject (FR) | 41.0% | 35.90% |
| Equal Error Rate (EER) | 11.87% | 9.61% |

The results indicate improved verification performance by reducing channel noise effects.

Figure 3:
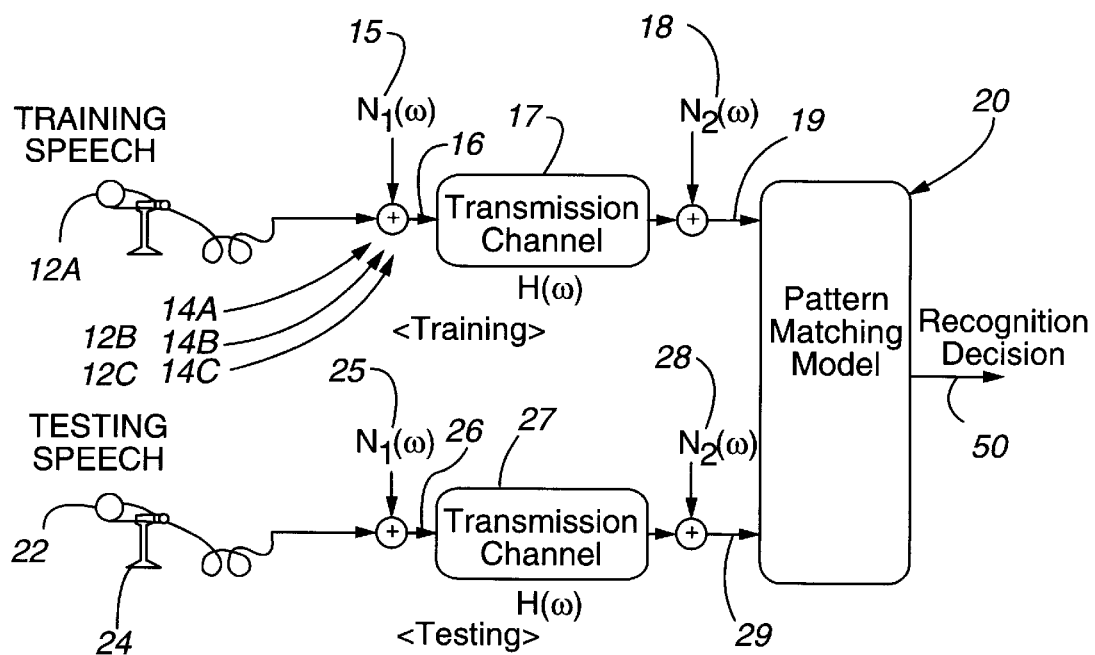
FIG. 3 is a schematic diagram of an alternate embodiment of a speech acquisition and verification system.

FIG. 3 is an alternate embodiment of a speech acquisition and verification system 10 and FIGS. 4A–4D illustrate the alternate embodiment for pattern matching model 20. Clean speech, S, is modeled in block 60 using cepstrum coefficient C. Clean speech, S, for example, can be obtained from a speaker speaking an utterance into a microphone in a noise free environment. In block 62, training speech 12, $S^i_{train}$, is obtained from a speaker speaking on various telephony devices 14A–C, as shown in FIG. 3. For example, 14A can be an electret handset, 14B can be a carbon button telephone and 14C can be a cellular phone. The training data can be received on the same or a different channel. Training speech $12_{A-N}$, $S^i_{train}$, is modeled using cepstrum coefficients $C_i$, i=1,2, ... N. In block 64, affine transform parameters $A_i$, $b_i$ are determined from cepstrum coefficients C and $C_i$. In block 65, affine transform parameters $A_i$, $b_i$ are registered in a database.

FIG. 4B is a schematic representation of the registration of the affine parameters, $A_i$, $b_i$, environment and classifiers in database 70. An index of the classifier is shown in column 72. Column 73 represents storing affine parameters ($A_1, b_1$), ($A_2, b_2$) ... ($A_N, b_N$) in database 70. The corresponding environment to the affine parameters is stored in column 74. A classifier for each cepstrum $C_i$ is determined and represented in column 75. The classifier can use conventional methods such as neural tree network or Gaussian mixture model (GMM) for classification.

Figure 4A:
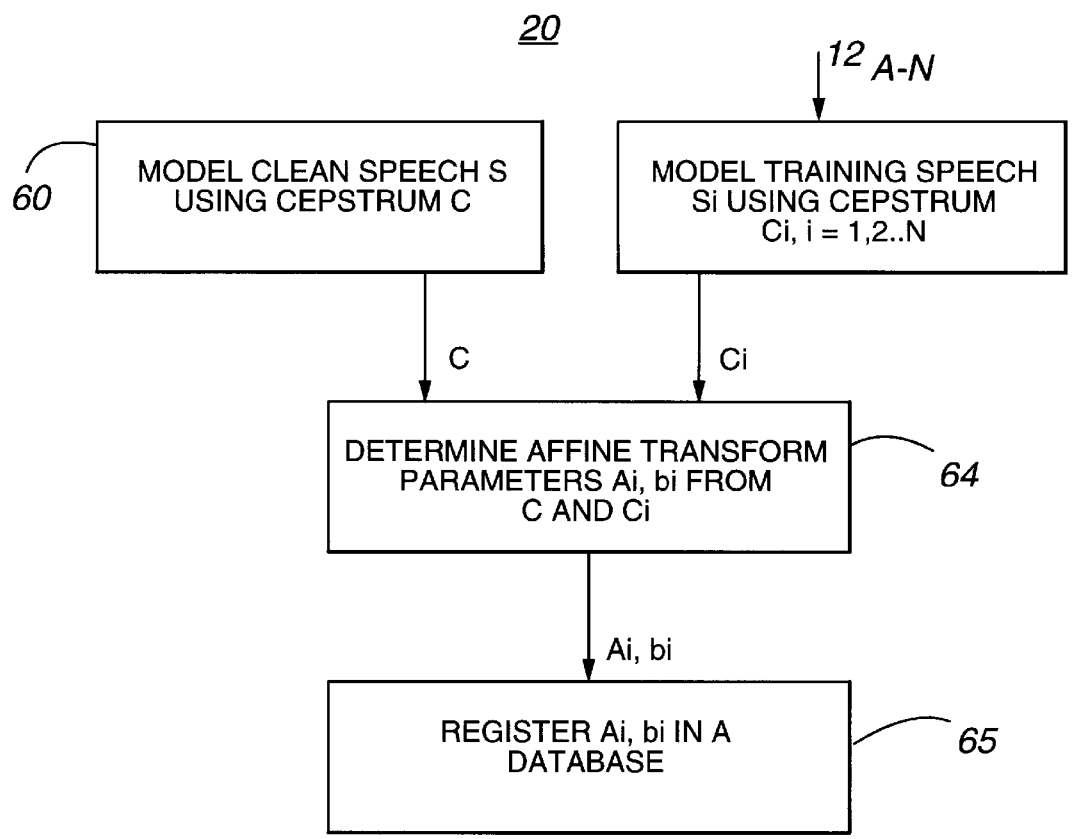
FIG. 4A is a flow diagram of data base registration for the alternate embodiment of the pattern matching model.
Figure 4C:
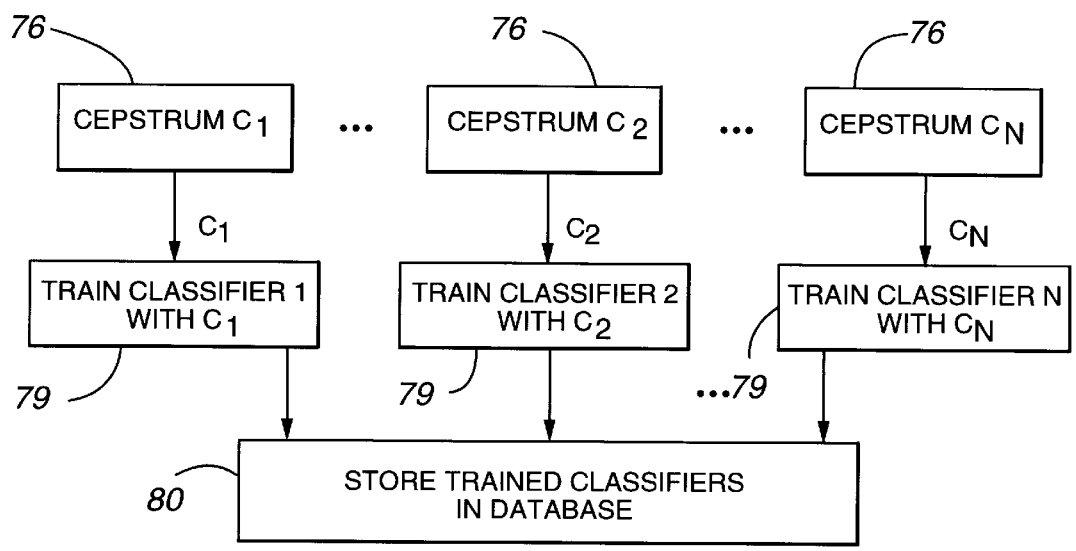
FIG. 4C is a flow diagram of the pattern matching model during training.
Figure 4D:
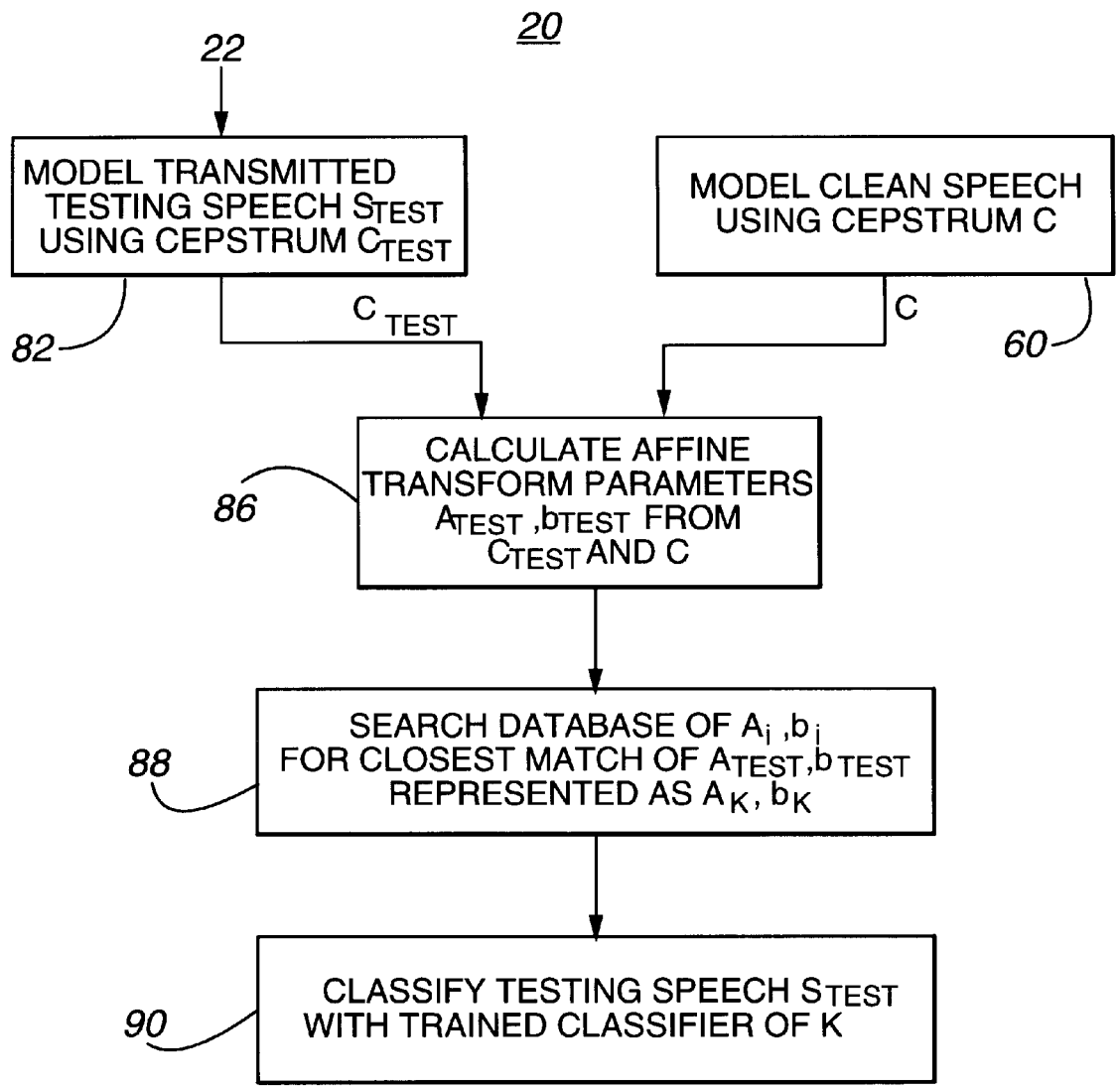
FIG. 4D is a flow diagram of the pattern matching model during testing.

FIG. 4C illustrates pattern matching model 20 during training. In blocks 76, cepstrum coefficient $C_1$ through cepstrum coefficient $C_i'$ for i=2 ... N, which were determined in block 62 are used to train respective classifiers 1 to i in blocks 79. In block 80, trained classifiers are stored in database 70 as represented by column 75. FIG. 4D illustrates pattern matching model 20 during testing. Testing speech 22, $S_{test}$, is uttered by the speaker and modeled using cepstrum coefficient $C_{test}$ in block 82. In block 86, affine transform parameters $A_{test}$, $b_{test}$ are determined from $C_{test}$ and cepstrum coefficient C of clean speech obtained from pre-processing block 60. In block 88, column 73 of database 70 is searched for the closest match of affine transform parameters $A_{test}$, $b_{test}$ to stored affine transform parameters $A_i$, $b_i$. The closest match can be represented by $A_k$, $b_k$. Therafter, in block 90 test speech $S_{test}$ is classified with the classifier of column 75 corresponding to k.

In accordance with the teachings of the present invention, pattern matching model 20 models channel and noise conditions with an affine transformation of the cepstrum coefficients. The affine transformation y of vector x can be defined as:

$$y = Ax + b$$

wherein A represents a matrix representing a linear transformation and b a non-zero vector representing the translation, y is the testing data and x corresponds to the training data. In the speech processing domain, the matrix A models the shrinkage of individual cepstral coefficients due to noise and the vector b accounts for the displacement of the cepstral mean due to the channel effects.

The cepstrum is by definition $$c(n) = Z^{-1}[\log S(z)] = Z^{-1}\left[\log \frac{1}{1 - \sum_{i=1}^{p} a_i z^{-1}}\right] \quad (1)$$

wherein S(z) is the speech signal, $a_i$ are linear predictive (LP) coefficients and p is the order of the LP model.

The cepstrum is a function of the linear predictor coefficients and the impulse response given as follows:

$$c(n) = \frac{1}{n}\sum_{i=1}^{p} i a_i h_s(n-i) \quad (2)$$

wherein $h_s$ is the impulse response associated with the LP transfer function model of the original speech of $$H(z) = \frac{1}{1 - \sum_{i=1}^{p} = a_i z^{-i}}$$

The matrix form of this equation is:

$$\begin{pmatrix} c(1) \\ c(2) \\ \vdots \\ c(N) \end{pmatrix} = \quad (3)$$

$$\begin{pmatrix} 1 & & & \\ & 1/2 & & \\ & & \ddots & \\ & & & 1/N \end{pmatrix} \times \begin{pmatrix} h_s(0) & 0 & \cdots & 0 \\ h_s(1) & h_s(0) & \cdots & 0 \\ \vdots & \vdots & \ddots & \vdots \\ h_s(p-1) & h_s(p-2) & \cdots & h_s(0) \\ \vdots & \vdots & \ddots & \vdots \\ h_s(N-1) & h_s(N-2) & \cdots & h_s(N-p) \end{pmatrix} \times$$

$$\begin{pmatrix} 1 & & & \\ & 2 & & \\ & & \ddots & \\ & & & p \end{pmatrix}\begin{pmatrix} a(1) \\ a(2) \\ \vdots \\ a(p) \end{pmatrix} = D_1 H_s D_2 a$$

wherein the first matrix of the right hand side is designated as $D_1$, the second matrix of the right hand side is designated as $H_s$ and the third matrix of the right hand side is designated as $D_2$ in order to define the cepstral coefficients as an affine transform.

Figure 5:
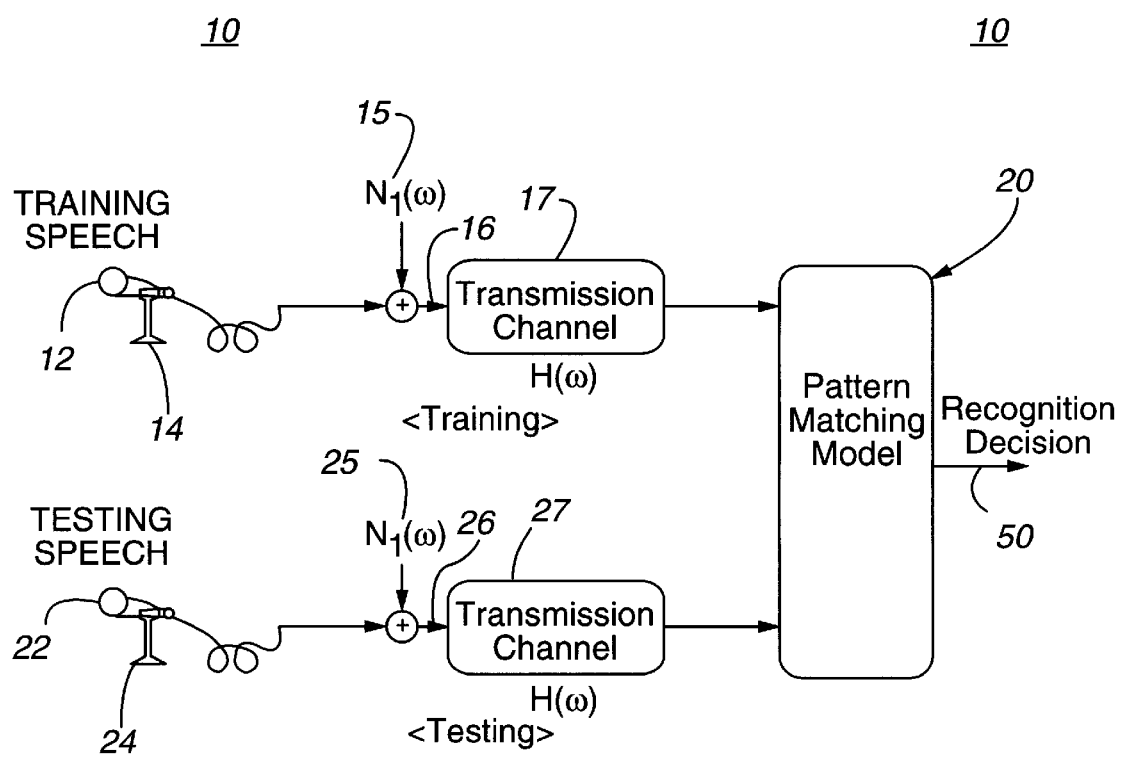
FIG. 5 is a schematic diagram of a speech acquisition and verification signal with noise and channel effects.

FIG. 5 represents a speech acquisition and training system 10 including degradation of speech 12 by noise $N_1(\omega)$, $N'_1(\omega)$ followed by degradation of transmission channels 17 and 27 which accumulated effect of degradation sources is equivalent to an affine transform. The cepstrum goes through the following two transformations:

$$c_{noisy} = Ac$$

$$c_{filtered} = c_{noisy} + b_c$$

wherein $c_{noisy}$ is the speech contaminated by noise $N_1(\omega)$ and $N_1(\omega)$ and $c_{filtered}$ is the cepstrum obtained at the output of respective channels 17 and 27. Matrix A represents the linear transform due to noise and vector $b_c$ represents the offset caused by the channel. The resulting cepstrum is $$c' = c_{noisy} + b_c$$

resulting in $$c' = Ac + b_c$$

Figure 6:
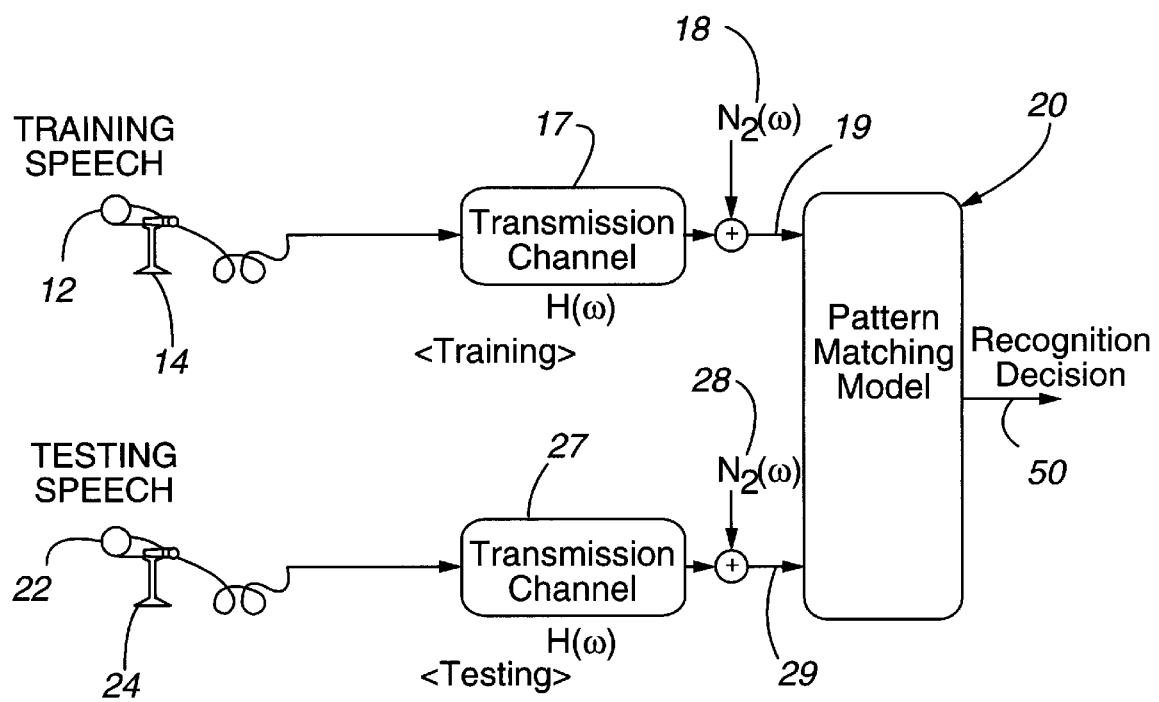
FIG. 6 is a schematic diagram of speech acquisition and verification signal system with channel and noise effects.

FIG. 6 represents a speech acquisition and training system 10 including degradation of speech 12 by channel 17 and 27 and noise, $N_2(\omega)$, and $N_2'(\omega)$. The transformation of the cepstrum is:

$$c_{filtered} = C_{original} + b_c$$

$$c_{noisy} = A c_{filtered}$$

The resulting observed cepstrum is $$c_{observed} = Ac + Ab_c$$

In general, c'=Ab+c.

The affine parameters $A_i$, $b_i$ for noise and channel conditions can be determined from two sets of cepstral vectors which are represented by vectors $c_i$ and $c'_i$ in which $c_i$ are the original cepstral vectors and $c'_i$ are the cepstral vectors of the corrupted speech. Vectors from the two sets can be grouped into pairs for example ($c'_k$, $c_k$). The $c'_k$ from a pair is the distorted version of $c_k$ from the same pair and can be represented by:

$$c_k'^T = A c_k^T + b \quad (4)$$

Both $c'_k$ and $c_k$ are column vectors of the same dimension which can be represented by:

$$c_k' = \begin{pmatrix} c'_{k1} \\ c'_{k2} \\ \vdots \\ c'_{kq} \end{pmatrix} \quad c_k = \begin{pmatrix} c_{k1} \\ c_{k2} \\ \vdots \\ c_{kq} \end{pmatrix} \quad (5)$$

The above equation can be expanded as $$\begin{pmatrix} c'_{k1} \\ \vdots \\ c'_{kq} \end{pmatrix} = \begin{pmatrix} a_{11} & \cdots & a_{1q} \\ \vdots & \ddots & \vdots \\ a_{q1} & \cdots & a_{qq} \end{pmatrix}\begin{pmatrix} c_{k1} \\ \vdots \\ c_{kq} \end{pmatrix} + \begin{pmatrix} b_1 \\ \vdots \\ b_q \end{pmatrix}, \text{ for } i = 1, 2, \ldots, N \quad (6)$$

Each individual row of matrix A elements a and the corresponding element for vector b are determined separately. To determine the $j^{th}$ row of A and $b_j$ component of each of the cepstral vectors of the testing condition results in a different form of the system equations given by $$\begin{pmatrix} c'_{1j} \\ \vdots \\ c'_{Nj} \end{pmatrix} = \begin{pmatrix} c_{11} & \cdots & c_{1q} & 1 \\ \vdots & \ddots & \vdots & \vdots \\ c_{N1} & \cdots & c_{Nq} & 1 \end{pmatrix}\begin{pmatrix} a_{j1} \\ \vdots \\ a_{jq} \\ b_j \end{pmatrix} \text{ for } j = 1, 2, \ldots, q. \quad (7)$$

The least squares solution to the above system of equations is $$\alpha_j = \begin{pmatrix} \alpha_{j1} \\ \vdots \\ \alpha_{ja} \\ b_j \end{pmatrix} = \begin{pmatrix} \sum_{i=1}^{N} c_i c_i^T & \sum_{i=1}^{N} c_i \\ \left(\sum_{i=1}^{N} c_i\right)^T & N \end{pmatrix}^{-1} \times \begin{pmatrix} c_1 & \cdots & c_N \\ 1 & \cdots & 1 \end{pmatrix} \alpha'_j \quad (8)$$

$$\text{wherein } \alpha'_j = \begin{vmatrix} c'_{ij} \\ c'_{2J} \\ c'_{nj} \end{vmatrix}$$

for $j=1, \ldots q$ and $\alpha_j$ is an augmented column vector whose first q entries from the $j^{th}$ row of matrix A and whose last entry is the $j^{th}$ element of the vector b. With the affine transform as presented above, the vectors for the training condition can be mapped into the space occupied by the vectors of the testing condition. The reverse mapping is also possible by solving for the vectors for the training condition in terms of the vectors for the testing condition.

Alternatively, solutions for the affine parameters A and b can be obtained for noise conditions only, (i.e., for $N_1(w)$ or $N_1'(w)$, shown in FIGS. 1 and 3 when channel 17 and 27 are the same represented by:

$$s'(n) = s(n) + e(n)$$

wherein s'(n) represents noisy speech, s(n) represents original speech and e(n) represents noise. Noise can be from the acoustical background of the sampled speech signal due to machines running in the background such as additive white noise. Multiplying the original vectors with a sound dependent matrix of the degraded cepstral vectors provides:

$$A = D_1 H_s D_2 (R_s + \sigma^2 I)^{-1} R_s (D_1 H_s D_2 0^{-1} \quad (9)$$

and b=0 wherein $D_1$, $H_s$ and $D_2$ are defined above, and $$R_s = \begin{pmatrix} r_s(0) & r_s(1) & \cdots & r_s(p-1) \\ r_s(1) & r_s(0) & \cdots & r_s(p-2) \\ r_s(2) & r_s(1) & \cdots & r_s(P-3) \\ \vdots & \vdots & \ddots & \vdots \\ r_s(p-1) & r_s(p-2) & \cdots & r_s(0) \end{pmatrix} \quad (10)$$

wherein $\sigma^2$ represents variance of noise, I is the identity matrix and $r_s$ are the autocorrelation coefficients of predictor coefficients $a_i$, speech S.

Solutions for affine parameters A, b for channel effects only, i.e., for different channels 17 and 27 without noise conditions $N_1(w)$, $N_1'(w)$ and $N_2'(w)$, can be represented as $s'(n) = h(n) \otimes s(n)$ in which h(n) is the impulse response of the channel.

The degraded cepstral coefficients provide:

$$A = D_1 H D_1^{-1} \quad (11)$$

and $$b = s(0) D_1 H H_s D_2 (HS)^{-1} h_1 \quad (12)$$

wherein:

$$H = \begin{pmatrix} h(0) & 0 & \cdots & 0 \\ h(1) & h(0) & \cdots & 0 \\ h(2) & h(1) & \cdots & 0 \\ \vdots & \vdots & \ddots & \vdots \\ h(N-1) & h(N-2) & \cdots & h(0) \end{pmatrix} \quad (13)$$

$$S = \begin{pmatrix} S(0) & 0 & 0 & \cdots & 0 \\ S(1) & S(0) & 0 & \cdots & 0 \\ S(2) & S(1) & S(0) & \cdots & 0 \\ \vdots & \vdots & \vdots & \ddots & \vdots \\ S(N-1) & S(N-2) & S(N-3) & \cdots & S(N-p) \end{pmatrix} \quad (14)$$

and $$h_1 = \begin{pmatrix} h(1) \\ h(2) \\ \vdots \\ h(N) \end{pmatrix} \quad (15)$$

Figure 7:
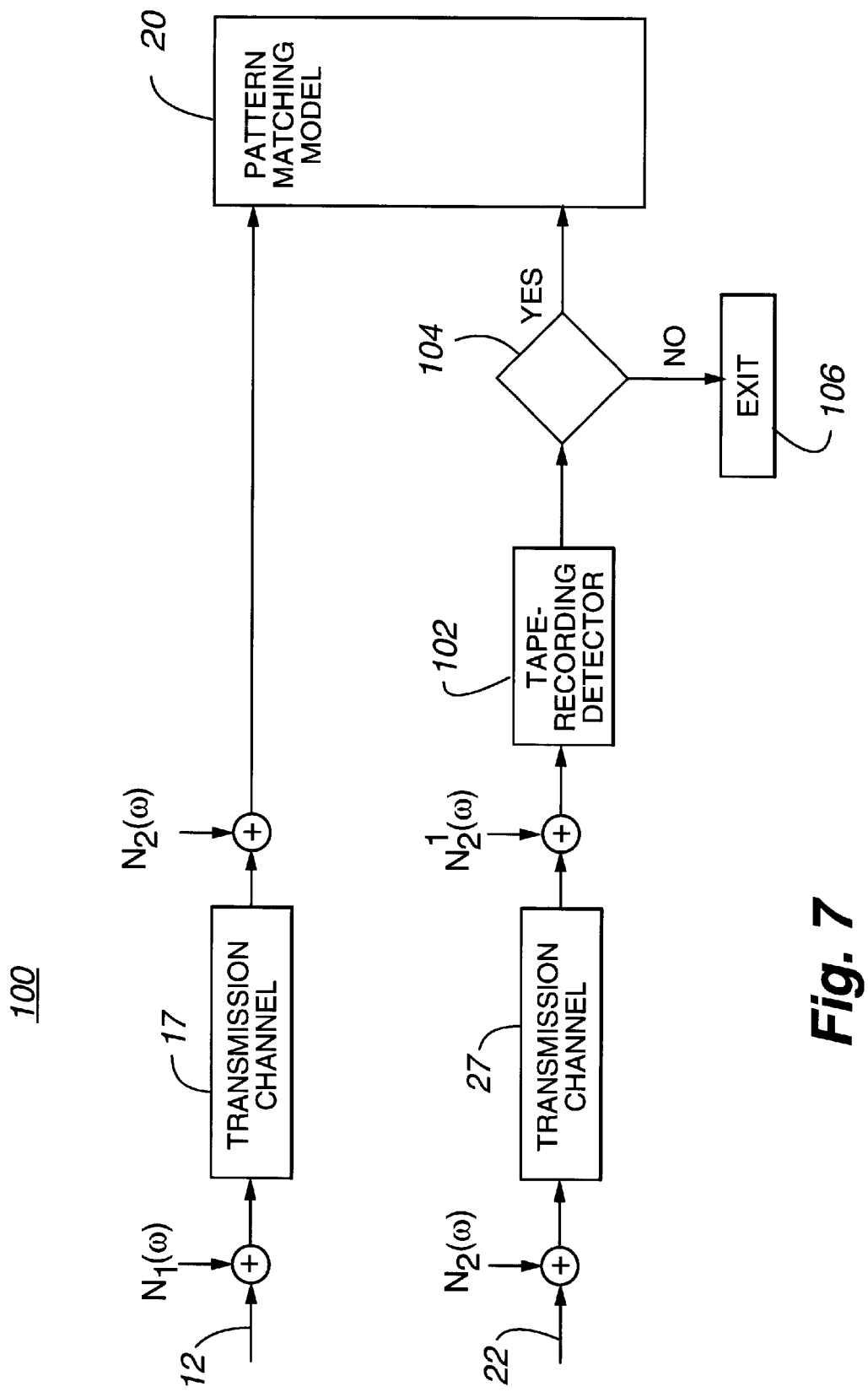
FIG. 7 is an alternate embodiment of the speech acquisition and verification system for detecting tape recorded speech.

FIG. 7 illustrates an alternate embodiment of speech acquisition and verification system 100 for detecting tape recorded speech. Fraudulent use of speaker verification and speech verification systems can arise if a tape recording is made of a predetermined password typically used for enrollment in the system. The tape recorded speech can be used by the fraudulent user to gain access to the system. Speech verification and acquisition system 100 includes tape recording detector 102 for detecting if testing speech 22, $S_{test}$, has been tape recorded. Decision module 104 makes a determination if the speech was or was not tape recorded. If testing speech 22, $S_{test}$, was not tape recorded, testing speech 22, $S_{test}$, is applied to pattern matching module 20, described above. If the testing speech 22, $S_{test}$, was tape recorded, the speaker is not accepted and the system is exited in module 106.

Figure 8:
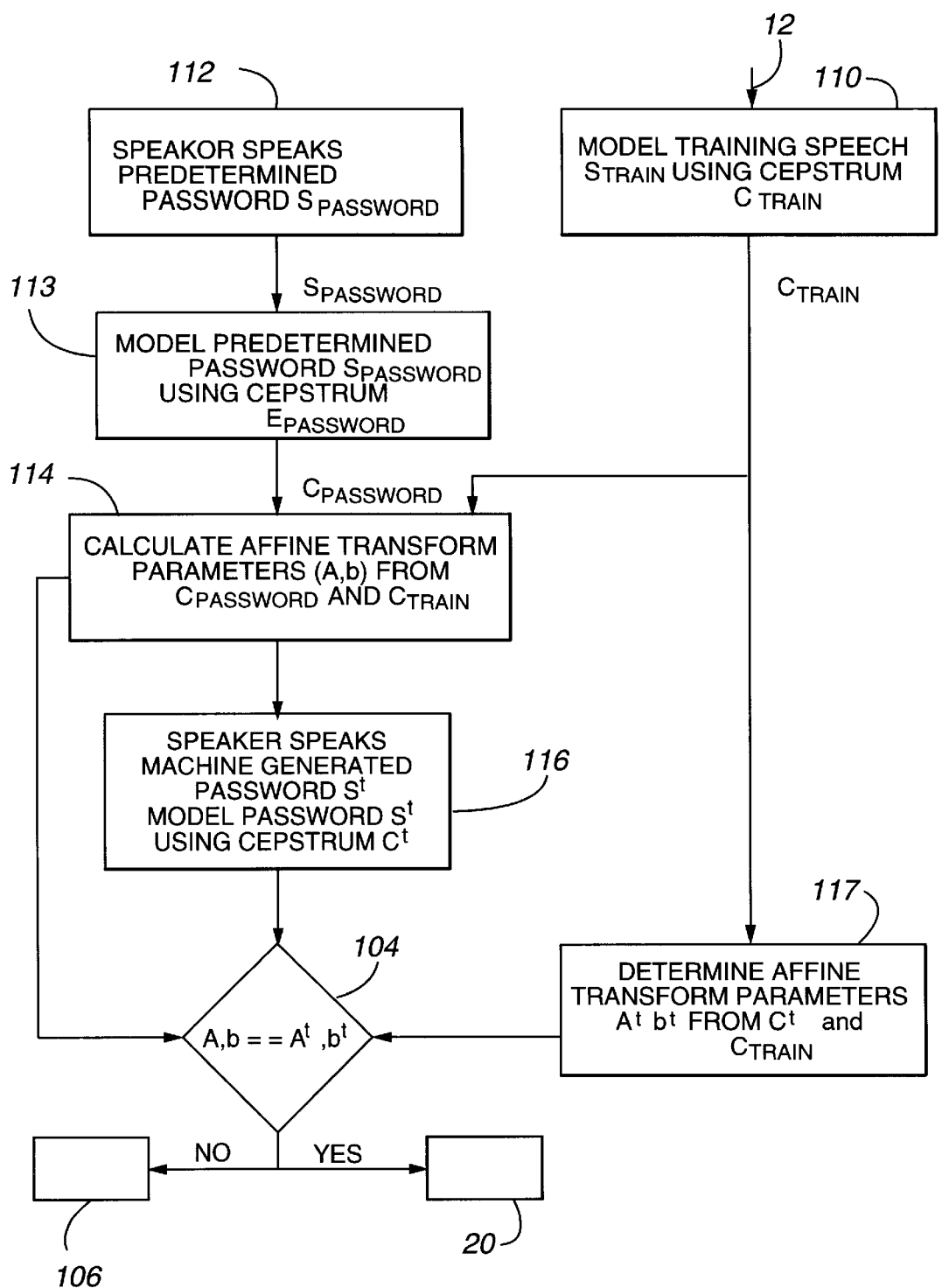
FIG. 8 is a flow diagram of the detection of tape recorded speech.

An implementation of tape recording detector 102 and tape recording decision module 104 is shown in FIG. 8. Training speech 12, $S_{train}$, is modeled using cepstrum $c_{train}$ in block 110. In block 112, a speaker is prompted to speak the predetermined password, $S_{password}$. The predetermined password $S_{password}$ is modeled using cepstrum $c_{password}$ in block 113. In block 114, affine transform parameters password A and b are determined from cepstrum $c_{password}$ and cepstrum $c_{train}$, as described above.

Thereafter, the speaker is prompted to speak a computer generated password, $S^t$ in block 116. Preferably, the computer generated password, $S^t$, is generated randomly. In block 116, computer generated password, $S^t$, is modeled with cepstrum $c^t$. Testing affine transformation parameters $A^t$ and $b^t$ are determined from cepstrum c' and cepstrum $c_{train}$ in block 117. Module 104 determines the equivalence of affine transform parameters A and b with testing affine transform parameters $A^t$ and $b^t$. Affine transform parameters, A, b and testing affine transform parameters $A^t$, $b^t$ are equivalent in speaker verification system 100 when the same channel and noise conditions for the passwords are used. In the case of tape recorded speech, the noise and channel conditions are different and affine transform parameters A, b and testing affine transform parameters $A^t$, $b^t$ are different.

Figure 9A:
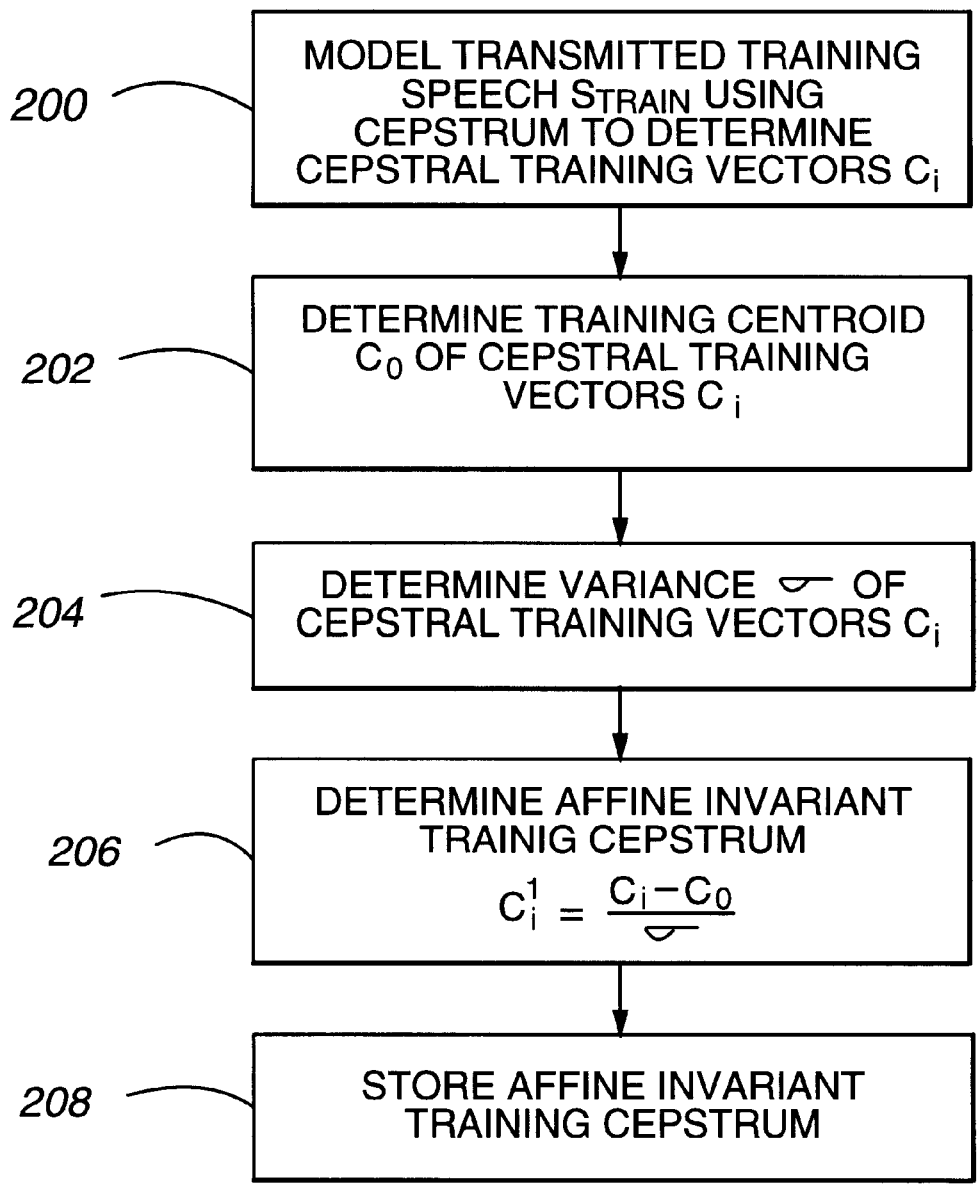
FIG. 9A is an alternate embodiment of the pattern matching model during training.
Figure 9B:
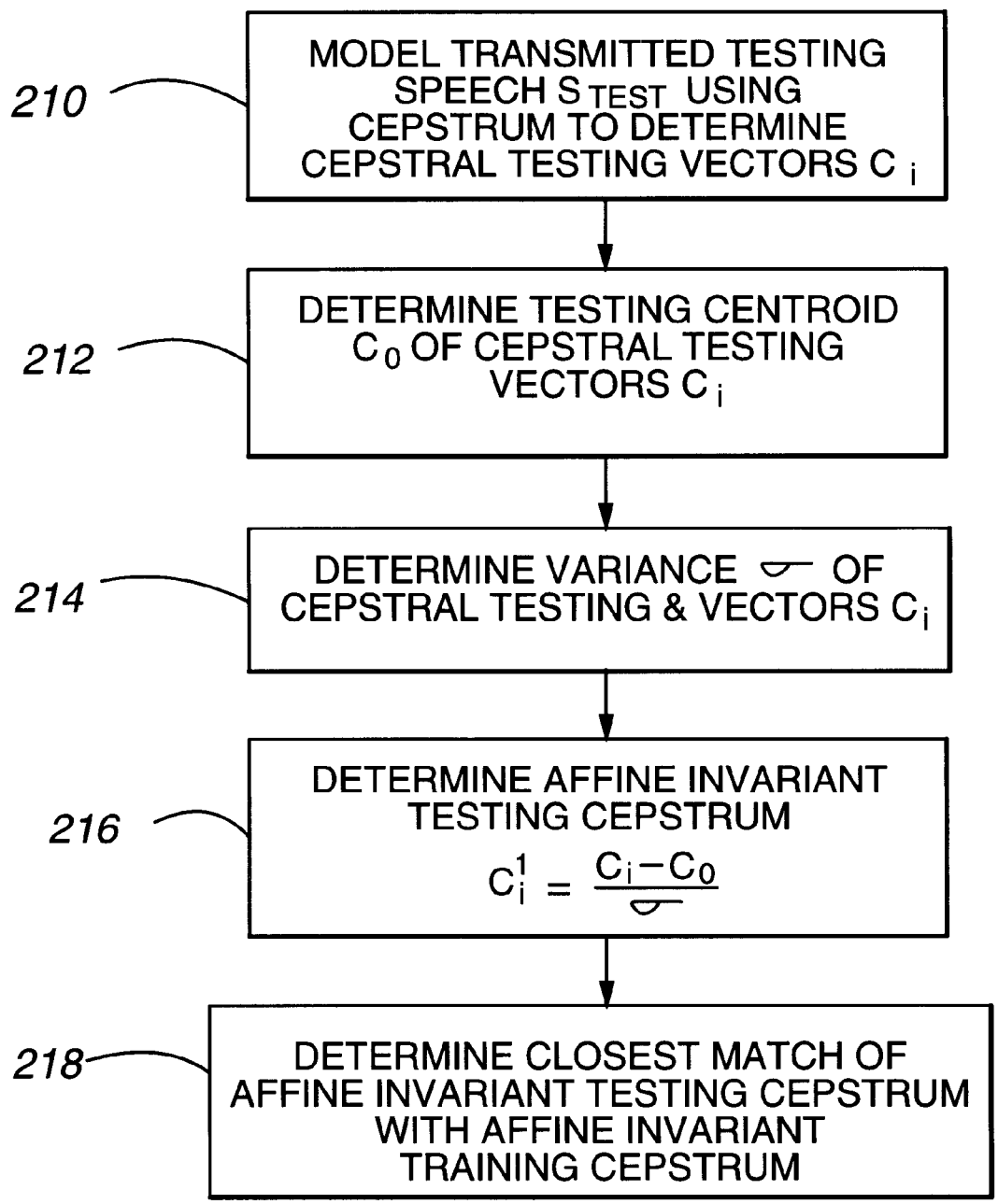
FIG. 9B is an alternate embodiment of the pattern matching model during testing.

FIGS. 9A and 9B illustrate an alternate embodiment of pattern matching model 20. It has been found that the cepstrum undergoes an affine transformation whenever speech is corrupted by noise and communication channel effects. An affine invariant cepstrum can be determined to model the speech to account for the channel and noise effects. In block 200, training speech $S_{train}$ transmitted to pattern matching model 20 is modeled using cepstrum to define cepstral training vectors $c_i$. A training centroid $c_0$ of the cepstral training vectors $c_i$ is determined in block 202 and a variance of the cepstral training vectors $c_i$ is determined in block 204. Thereafter, in block 206, an affine invariant training cepstrum $c_i$ is determined by:

$$c'_i = \frac{c_i - c_o}{\sigma}$$

The affine invariant training cepstrum c' is stored in block 208.

In block 210, testing speech $S_{test}$ transmitted to pattern matching model 20 is modeled using cepstrum to define cepstral testing vectors $c_i$. Similar to blocks 202 through 206, an affine invariant training cepstrum $c'_i$ is determined in blocks 212 through 216 by determining a testing centroid $c_0$ and variance from the cepstral testing vectors $c_i$. Thereafter, the closest match of affine invariant testing cepstrum with the stored affine invariant training cepstrum is determined to thereby identify the testing speaker with the training speaker.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

We claim:

1. A method for processing speech comprising the steps of:

determining affine transform parameters from clean speech and development speech samples;

generating an extended data set from a training speech sample and said affine transform parameters;

training a plurality of classifiers with said extended data set to provide trained classifiers; and classifying a testing speech sample with said trained classifier for forming classified output, wherein the affine transform has the form:

$$c_k^T = A c_k^T + b$$

wherein said affine transform parameters are represented by A and b and A is a matrix representing said deviations of said noise and b represents said deviations of said channel; $C_k^T$ represents said cepstrum coefficients of said development speech sample and $C_k^T$ represents said cepstrum coefficients of said clean speech sample; wherein said affine transform is solved by:

$$\alpha_j = \begin{pmatrix} \alpha_{j1} \\ \vdots \\ \alpha_{ja} \\ b_j \end{pmatrix} = \begin{pmatrix} \sum_{i=1}^N c_i c_i^T & \sum_{i=1}^N c_i \\ \left(\sum_{i=1}^N c_i\right)^T & N \end{pmatrix}^{-1} \times \begin{pmatrix} c_1 & \cdots & c_N \\ 1 & \cdots & 1 \end{pmatrix} \alpha_j^i$$

for $j=1 \ldots q$ and $\alpha_j$ is augmented column vector having first q entries from the $j^{th}$ row of matrix A and last entry is the $j^{th}$ element of vector b;

wherein said affine transform parameters correct for deviations of channel and noise in said training speech sample and said testing speech sample.

2. A method for processing speech comprising the steps of:

modeling a clean speech sample with a cepstrum C;

modeling a plurality of training speech samples with cepstrum $C_i$ for each of said training speech samples $i=1, 2 \ldots N$;

determining a plurality of training affine transform parameters from said cepstrum C and said cepstrum $C_i$;

storing said plurality of affine transform parameters in a database;

training a plurality of classifiers with each classifier being trained by one of said cepstrum $C_i$;

storing said plurality of classifiers in said database;

modeling a testing speech sample with a cepstrum $C_{test}$;

determining testing affine transform parameters from said cepstrum $C_{test}$ and said cepstrum C;

searching said affine transform parameters stored in said database for the closest match of said testing affine transform parameters and said testing transform parameters; and classifying said testing speech sample with said trained classifiers wherein the affine transform has the form:

$$c_k^T = A c_k^T + b$$

wherein said affine transform parameters are represented by A and b and A is a matrix representing said deviations of said noise and b represents said deviations of said channel; $C_k^T$ represents said cepstrum coefficients of said development speech sample and $C_k^T$ represents said cepstrum coefficients of said clean speech sample; wherein said affine transform is solved by:

$$\alpha_j = \begin{pmatrix} \alpha_{j1} \\ \vdots \\ \alpha_{ja} \\ b_j \end{pmatrix} = \begin{pmatrix} \sum_{i=1}^N c_i c_i^T & \sum_{i=1}^N c_i \\ \left(\sum_{i=1}^N c_i\right)^T & N \end{pmatrix}^{-1} \times \begin{pmatrix} c_1 & \cdots & c_N \\ 1 & \cdots & 1 \end{pmatrix} \alpha_j^i$$

for $j=1 \ldots q$ and $\alpha_j$ is augmented column vector having first q entries from the $j^{th}$ row of matrix A and last entry is the $j^{th}$ element of vector b.

3. A method for processing speech comprising the steps of:

determining cepstral vectors $c_i$ from a speech sample;

determining an affine invariant cepstrum from said cepstral vectors by
      determining a centroid $c_o$ of said cepstral vectors $c_i$;
      and determining a variance $\sigma$ of said cepstral vectors $c_i$,
      wherein said affine invariant cepstrum has the form $$c'_i = \frac{c_i - c_o}{\sigma}.$$

and modeling said speech sample with said affine invariant cepstrum for producing processed speech, wherein said affine invariant cepstrum corrects for deviation of channel and noise in said speech sample.

4. A method for speaker verification comprising the steps of:

modeling a transmitted training speech sample from a speaker using cepstral training vectors $c_i$;

determining an affine invariant training cepstrum from said cepstral training vectors $c_i$ by;

storing said affine invariant training cepstrum;

modeling a transmitted testing speech sample from a speaker using cepstral training vectors $c_i$;

determining an affine invariant testing cepstrum from cepstral testing vectors $c_i$;

comparing said affine invariant testing cepstrum with said stored affine invariant training cepstrum, wherein a match of said affine invariant testing cepstrum with said affine invariant training cepstrum indicates a verified speaker and;

wherein said affine invariant cepstrum is determined from the steps of determining a centroid $c_o$ of said cepstral vectors $c_i$;
and determining a variance $\sigma$ of said cepstral vectors $c_i$, wherein said affine invariant cepstrum has the form $$c'_i = \frac{c_i - c_o}{\sigma}.$$

5. A system for speaker verification comprising:

means for modeling a transmitted training speech sample from a speaker using cepstral training vectors $c_i$;

means for storing said affine invariant training cepstrum;

means for modeling a transmitted testing speech sample from a speaker using cepstral training vectors $c_i$;

means for determining an affine invariant testing cepstrum from cepstral testing vectors $c_i$;

means for comparing said affine invariant testing cepstrum from said stored affine invariant training cepstrum, wherein a match of said affine invariant testing cepstrum with said affine invariant training cepstrum indicates a verified speaker and wherein said affine invariant cepstrum is determined from the steps of:

determining a centroid $c_o$ of said cepstral vectors $c_i$;
and determining a variance $\sigma$ of said cepstral vectors $c_i$, wherein said affine invariant cepstrum has the form $$c'_i = \frac{c_i - c_o}{\sigma}.$$

6. A method for speech recognition comprising:

modeling a transmitted training speech sample from a speaker using cepstral training vectors $c_i$;

determining an affine invariant training cepstrum from said cepstral training vectors $c_i$;

storing said affine invariant training cepstrum;

modeling a transmitted testing speech sample from a speaker using cepstral training vectors $c_i$;

determining an affine invariant testing cepstrum from cepstral testing vectors $c_i$;

comparing said affine invariant testing cepstrum with said stored affine invariant training cepstrum, wherein a match of said affine invariant testing cepstrum with said affine invariant training cepstrum indicates a verified speaker;

wherein said affine invariant cepstrum is determined from the steps of:

determining a centroid $c_o$ of said cepstral vectors $c_i$;
and determining a variance $\sigma$ of said cepstral vectors $c_i$, wherein said affine invariant cepstrum has the form $$c'_i = \frac{c_i - c_o}{\sigma}.$$

7. A system for speech recognition comprising:

means for modeling a transmitted training speech sample of a pattern using cepstral training vectors $c_i$;

means for determining an affine invariant training cepstrum from said cepstral training vectors $c_i$;

means for storing said affine invariant training cepstrum;

means for modeling a transmitted testing speech sample of said pattern using cepstral training vectors $c_i$;

means for determining an affine invariant testing cepstrum from cepstral testing vectors $c_i$;

means for comparing said affine invariant testing cepstrum with said stored affine invariant training cepstrum, wherein a match of said affine invariant testing cepstrum with said affine invariant training cepstrum indicates a recognized speech pattern wherein said affine invariant cepstrum is determined from the steps of:

determining a centroid $c_o$ of said cepstral vectors $c_i$;
and determining a variance $\sigma$ of said cepstral vectors $c_i$, wherein said affine invariant cepstrum has the form $$c'_i = \frac{c_i - c_o}{\sigma}.$$

* * * * *